United States Patent
Neidhardt

[11] 3,976,122
[45] Aug. 24, 1976

[54] COMBINATION REFRIGERATOR-THAWER APPARATUS

[75] Inventor: Graham B. Neidhardt, Oreland, Pa.

[73] Assignee: McGraw-Edison Company, Elgin, Ill.

[22] Filed: Mar. 31, 1975

[21] Appl. No.: 563,577

[52] U.S. Cl. .................... 165/27; 165/48; 165/61; 165/64; 165/14; 34/213
[51] Int. Cl.² .............................. F25B 29/00
[58] Field of Search .................. 165/12, 30, 48, 61, 165/64, 14, 27, 42; 34/212, 213; 126/261, 268

[56] References Cited
UNITED STATES PATENTS

| | | | |
|---|---|---|---|
| 2,265,633 | 12/1941 | Cornwell | 165/30 |
| 3,135,316 | 6/1964 | Foster et al. | 165/12 |
| 3,199,579 | 8/1965 | Foster et al. | 165/48 |
| 3,579,849 | 5/1971 | Freeman | 34/212 |

*Primary Examiner*—Albert W. Davis, Jr.
*Assistant Examiner*—James D. Liles
*Attorney, Agent, or Firm*—Charles F. Lind

[57] ABSTRACT

This invention teaches a combination refrigerator-thawer cabinet that can be used as a conventional refrigerator or as a thawer for quick thawing frozen food without allowing the temperature of the food to exceed a predetermined guideline temperature, such as 45°F. The disclosed unit is similar to a standard refrigerator having a cabinet for holding the food, but further has an auxiliary air circulating plenum located within the cabinet. Heating means are located within the plenum, and plenum fans draw the cabinet air into the plenum to be heated by the heating means and subsequently to be discharged back into the cabinet. The plenum air flow arrangement provides that the plenum outlets are adjacent the top and bottom cabinet walls and the plenum inlets are near the middle of the cabinet, and this minimizes the formation of hot spots where heated thawing air is blasted directly against the food. The auxiliary air circulating plenum fans remain in operation during the entire thaw cycle to improve the heat transfer characteristics; while the heating means are cycled on and off responsive respectively to sensed low and high cabinet air temperature, and preferably the refrigeration means is cycled on when the heating means is cycled off, and vise versa. This operation maintains a large average differential between the food temperature and the cabinet air temperature, again for quick thawing without exceeding some guideline maximum temperature.

5 Claims, 6 Drawing Figures

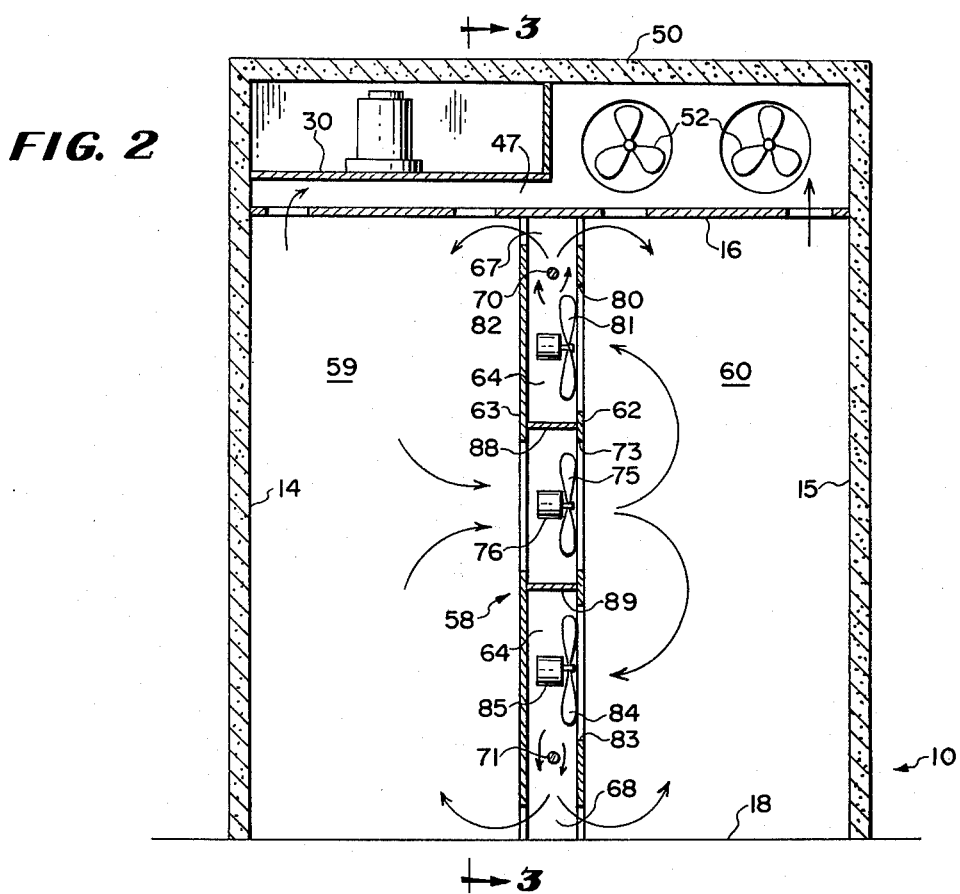
FIG. 2
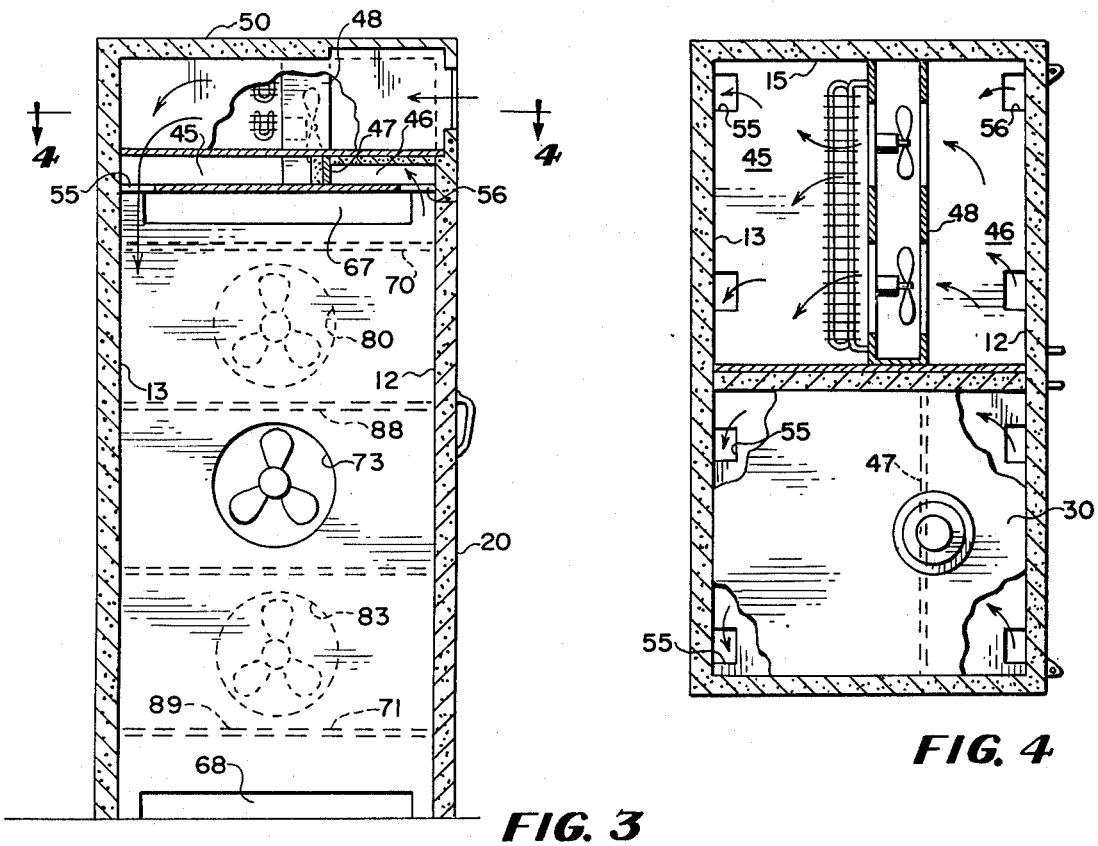
FIG. 3
FIG. 4

COMBINATION REFRIGERATOR-THAWER APPARATUS

BACKGROUND OF THE INVENTION

The Department of Health, Education, and Welfare under the Food and Drug Administration (FDA) is becoming increasingly aware of the potential food-born illness or microbiological contamination of food incident to the improper care of storage of food prior to the final consumption. One very important area of concern is proper storage of the food, and this typically must be at temperatures below 45°F to minimize the growth of bacteria which takes place much more rapidly at higher temperatures, such as room temperature. The normal refrigeration cabinets available for restaurant use adequately serve this need in the pure storage of food.

However, the thawing of frozen food prior to the cooking, preparation, serving, and final consumption is another matter. It is not uncommon for restaurant employees merely to remove frozen food from the freezer and set the food exposed on a table or counter for a period such as overnight or longer subjected to room temperature in order to thaw the food. This is unsanitary in that insects or rodents can be attracted to and even successfully have access to the food, and secondly the surface temperature of the food typically approaches that of the room temperature, thereby greatly exceeding the upper safe storage temperature and more commonly for extended periods. The FDA, many local state or city sanitary or health departments, and the National Sanitation Foundation serving the restaurant industry are now proposing stringent rules on the proper manner of thawing frozen food with some guidelines of maximum allowable surface temperatures likely to be established.

SUMMARY OF THE INVENTION

This invention relates to a combination refrigerator-thawer cabinet optionally used as a conventional refrigerator or as a thawer for quick thawing of frozen food products without allowing the temperature of the food products to exceed a predetermined guideline temperature, such as 45°F. The cabinet is particularly suited for restaurant or institutional feeding use, where mass thawing of frozen food in a relatively short time is required, and again where safe thawing conditions must be maintained. When the thawing has been completed, the cabinet immediately can be operated as a storage refrigerator for the indefinite term storage of such thawed food.

A particular feature of this invention is the use in combination with a cabinet for holding the food of an auxiliary air circulating plenum located within the cabinet, where the plenum outlets are adjacent the top and bottom cabinet walls and the plenum inlets are near the middle of the cabinet. Heating means are located adjacent the plenum outlets, and fans draw the cabinet air into the plenum to be heated by the heating means and subsequently to be discharged back into the cabinet from the plenum outlets. The plenum arrangement minimizes the formation of hot spots where heated thawing air is blasted directly against the food. The auxiliary air circulating fans remain in operation during the entire thaw cycle and improve the heat transfer characteristics in order to thaw the food quickly. The heating means are cycled on and off responsive respectively to sensed low and high cabinet air temperatures. The operating controls further cycle the refrigeration means on when the heating means is cycled off, and vise versa. This maintains a large average temperature differential between the food temperature and the cabinet air temperature. Although the fool temperature may start at 0°F, it is to be noted that most of the heat required to thaw the food probably is required at the food thawing temperature, typically at or near 32°F, during which time the latent heat factor is experienced because of the change of state of the food. Working with the safe guideline surface temperature for the food of 45°F, the maximum temperature differential possible during this thawing phase is thus approximately 13°F; however, by rapidly heating and then cooling the cabinet air temperature and because of the lag time in having the food assume the air temperature, it is thus possible and preferable to cycle on and off between sensed cabinet air temperatures of 42°F and 48°F, thereby giving a mean temperature of 45°F.

BRIEF DESCRIPTION OF THE DRAWINGS

FIG. 2 is a sectional view as seen through the center of the cabinet or generally from line 2—2 in FIG. 1, showing particular details of construction;

FIG. 3 is a sectional view, as seen generally from line 3—3 in FIG. 2, showing still additional details of construction;

FIG. 4 is a sectional view, as seen generally from line 4—4 in FIG. 3, showing additional details of construction;

DETAILED DESCRIPTION OF THE INVENTION

Figure 1:
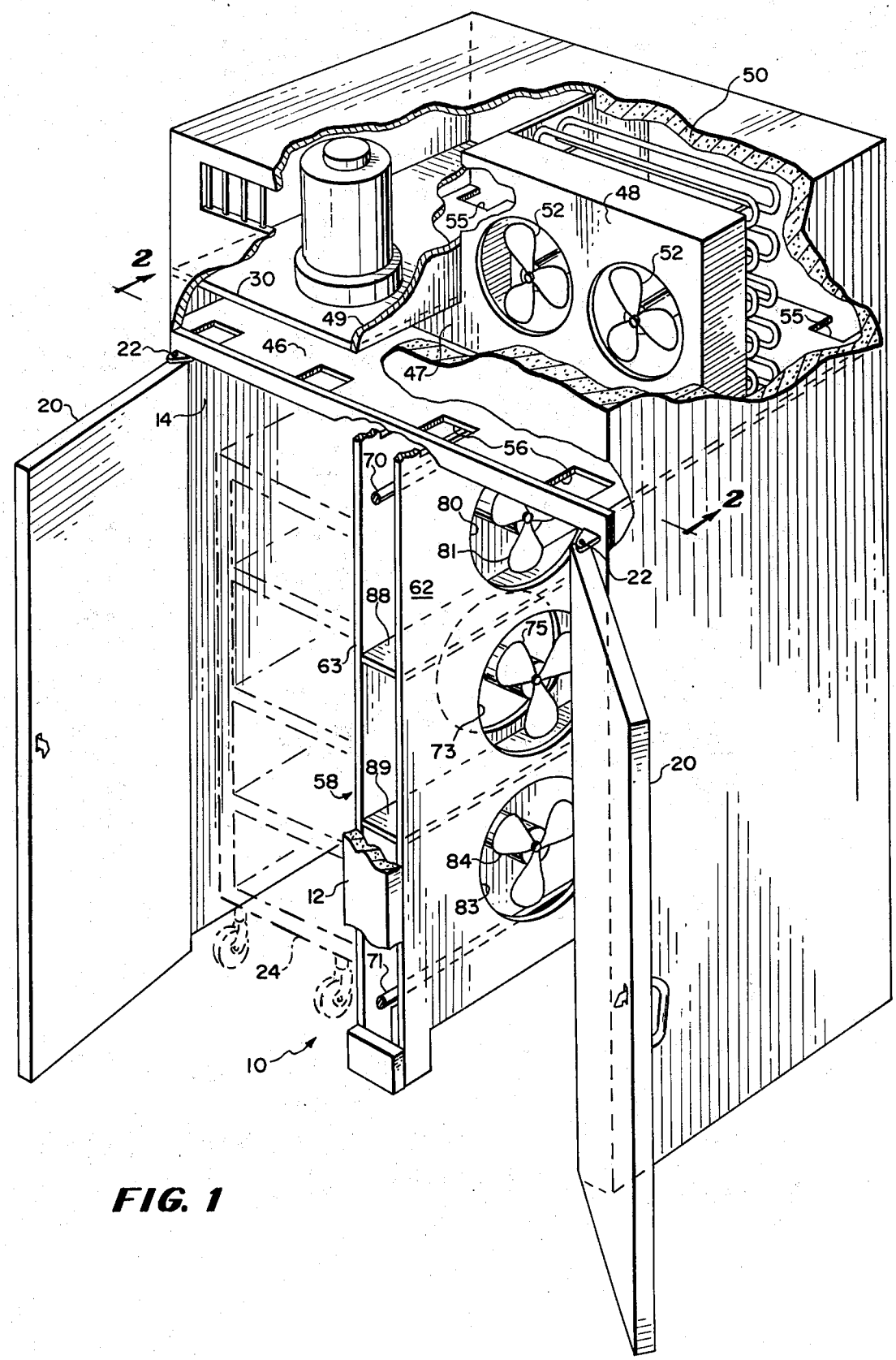
FIG. 1 is a perspective view, partly broken away and in section for clarity of disclosure, of a combination refrigerator-thawer cabinet made in accordance with a preferred embodiment of the subject invention.

In FIGS. 1–4, cabinet 10 illustrated has an interior enclosure defined by opposed pairs of side walls 12 and 13, and 14 and 15 respectively, and a top wall 16 and a bottom wall or floor 18. The front side wall 12 has two openings therein and a pair of doors 20 hinged at pins 22 selectively close the openings to provide roll-in access of carts (one shown in phantom at 24) into the cabinet enclosure. When the doors are closed and secured the cabinet enclosure is generally sealed and isolated from the outside atmosphere, as is well known in the refrigeration art.

Figure 5:
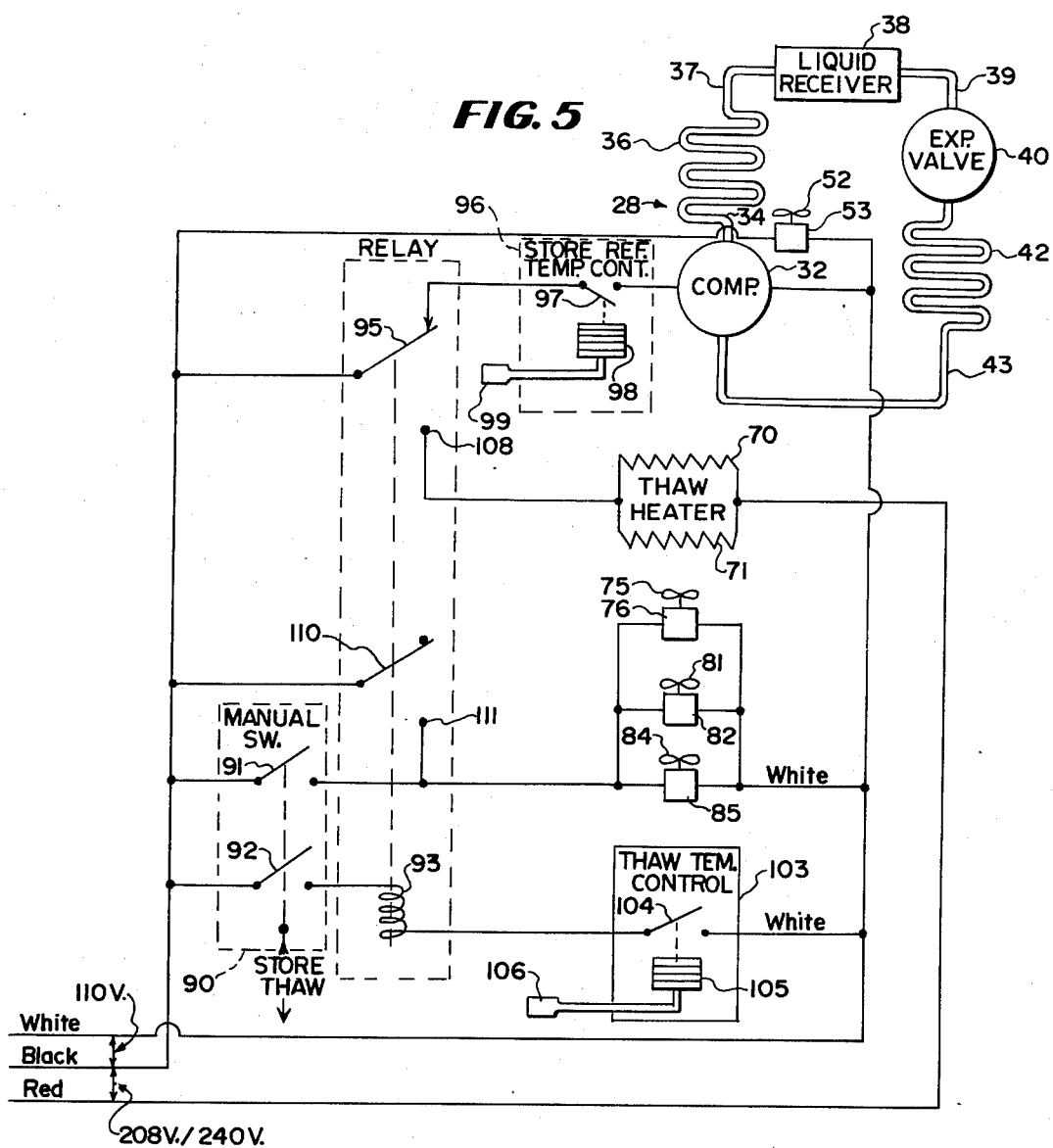
FIG. 5 is a schematic circuit of the electrical control for operating the cabinet shown in FIGS. 1–4.

A sealed refrigeration unit 28 (FIG. 5) is supported generally on cabinet wall 30, and includes a compressor 32 connected at its outlet by line 34 to a condenser coil 36 in turn connected by line 37 to liquid receiver 38 in turn connected by line 39 to expansion valve 40 in turn connected by line 41 to evaporator coil 42 in turn connected by line 43 to the inlet of compressor 32. The refrigeration unit is relatively standard in the industry.

Cabinet structure further provides for recirculating air over the evaporator coil 42 into a cold air duct or manifold 45 for distribution to and through the cabinet enclosure and back through a return duct or manifold 46 to the coil. In this regard, a vertical partition wall 47 extends crosswise of the cabinet interconnecting the cabinet walls 16 and 30 and extended between the side wall 14 generally to shrouding 48 for the evaporator coil 42, and the shrouding 48 then continues interconnecting the cabinet walls 16 and 50 between intermediate side wall 49 and side wall 15. The shrouding 48 has openings therein and fan means 52 powered by motors 53 are mounted in the openings for moving the return side air through the evaporator coil 42 into the cold air manifold 45, and openings 55 and 56 in the enclosure top wall 16 provide communication from the defined manifolds to and from the cabinet enclosure. Specifically, the openings 55 from the cold air manifold 45 are located adjacent the rear side wall 13 of the cabinet for causing a downward cold air flow at the rear wall and openings 56 to the return air manifold 46 are located adjacent the front wall or the doors of the cabinet for creating an upward return air flow adjacent the front wall of the cabinet.

It will be understood that the walls defining the cabinet enclosure are insulated to prevent heat loss from the enclosure, as further are the exterior walls defining air distribution duct means or manifolds 45 and 46.

The cabinet 10 shown herein further has a vertical partition 58 which interconnects one pair of opposed side walls, specifically the front wall 12 and the rear wall 13 and the same thereby divides the cabinet into two sections 59 and 60. A door opening lines up with each section. The partition 58 is defined by horizontally spaced panels 62 and 63 that define a plenum 64 therebetween. Each of the partition panels 62 and 63 has upper and lower edges respectively which are spaced from the top and bottom cabinet enclosure walls and these thereby define upper and lower plenum outlets 66 and 67 open to both sections. Each outlet is disposed immediately adjacent the respective top or bottom cabinet wall so that air flow from the outlet tends to be parallel to the wall. Electric strip heaters or heating elements 70 and 71 are supported by the partition recessed between the spaced panels 62 and 63 and these heaters extend generally across the cabinet between the front and rear side walls in heat exchange relationship with the plenum air.

Duct means 73 communicates through aligned openings in the panels 62 and 63 between the adjacent cabinet sections 59 and 60. The duct passage however, is separated or isolated from the plenum 64 by walls 88 and 89 that connect between the adjacent front wall 12 and rear wall 13. A fan 75 is supported within the through opening 73, and a motor 76 powers the fan to circulate air through the duct from the left section 59 (FIG. 2) to the right section 60.

The partition 58 further has upper and lower inlet plenum openings 80 and 83 formed in the panel 62 which faces the enclosure 60 and a second fan means 81 and 84 is located within each respective inlet opening. Motors 82 and 85 respectively power the fans to draw air in from the right section 60 as an inlet to the plenum and force the air from the top and bottom plenum outlets 66 and 67 previously noted. The plenum air is thus forced over the heating elements 70 and 71 and discharged outwardly from the plenum generally along the top and bottom cabinet walls to both adjacent sections 59 and 60.

Appropriate safety grills (not shown) of conventional design span the inlet and outlet openings to enclose the respective fans. The fans 75, 81, and 84 each is of a conventional axial flow or propeller type and is supported within the respective openings by conventional brackets or the like (not shown).

CONTROL AND OPERATION OF THE INVENTION

A selector 90 is mounted on the front cabinet wall and can be manually shifted between a "store" position where the cabinet operates as a standard refrigerator and a "thaw" position where the cabinet operates as a frozen food thawer. The selector 90 actually comprises a double pole-single throw switch having two moving contacts (FIG. 5) 91 and 92 which are open in the store or refrigeration position. The contact 92 connects through a coil 93 of a relay 94, which is in the form of a double pole-double throw switch, so that when the coil is not energized the relay is in the position as shown. In this deenergized position, one moving switch contact 95 connects through a refrigerator temperature control 96 and the compressor 32 of the refrigeration unit 28 to power the refrigeration unit responsive to set high and low temperature limits.

Specifically, the control 96 would typically include a contact 97 that is opened and closed by a closed system bellows 98 pressurized upon changing temperatures sensed by the bulb 99, where the bulb typically is secured to the fan panel 48 on the return air side to sense the return cabinet air temperature. Accordingly, the increase in sensed temperature of the bulb 99 to a predetermined high limit closes the switch contact 97 to operate the refrigeration unit 28 until the low temperature limit is sensed so as to open the switch 97. The distribution fans 52 are operated continuously to move the air over the evaporator coil to and throughout the cabinet enclosure; while the auxiliary or thaw fans 75, 81, and 84 are not operating at all in the "store" control position. The high and low limit temperatures of the refrigeration control 96 would depend on the average storing temperature sought in the refrigerated enclosure, which might be 38°F, and on the accuracy or sensitivity of the control; but typically would be within plus or minus 5°F of the desired storage temperature.

When the control 90 is in the "thaw" position and the switch contact 92 is closed, a circuit is potentially completed through the relay coil 93 and a thaw temperature control device 103, depending on if the thaw control switch contact 104 were closed. The second contact 91 of the manual selector 90 completes a circuit through the thaw fans 75, 81, and 84 to provide continuous operation of such fans whenever the selector is in the "thaw" position.

Normally the thaw temperature control 103 would likewise consist of the moving contact 104 opened and closed by a bellows 105 connected to a temperature sensing bulb 106. The bulb 106 preferably would be located in the air stream on the return air side of the fan panel 48 to sense the return air from the cabinet. Typically, sensing bulbs 99 and 106 can be mounted side-by-side at the same general location on the fan panel 48. The operating high and low temperature limits of the thaw control 103 would preferably be higher than those of the refrigeration control 96, where the contact 104 would open, for example, at sensed cabinet air temperature approaching 48°F and would close at sensed cabinet air temperature approaching 42°F; thus the contact 104 is generally closed during normal cycling of the refrigerator control 96, although in the "store" position the thaw control 103 is not in circuit because of the open manual switch contact 92.

To operate the cabinet as a thawer, the expected use would be to roll a cart loaded with frozen food into the enclosure. The operator then shifts the manual selector 90 to the "thaw" position which energizes the auxiliary thaw fans 75, 81, and 84. Normally the sensed cabinet air temperature is or will very shortly be appreciably below the high limit temperature set on the thaw control 103 which then energizes thaw heaters 70 and 71 and deenergizes the refrigeration unit 28. The thaw control thereby bypasses the refrigeration control 96. The heaters operate until the high limit cabinet air temperature is sensed in the thaw control 103, which thereby opens the switch 104 to shift the relay contact 95 to deenergize the thaw heaters 70 and 71 and simultaneously energize the refrigeration unit 28. This occurs, since as noted above, the lower limit temperature set for the refrigeration controls 96 normally is well below the thaw temperature limits and contact 97 is thus closed. The auxiliary fans remain on because of the closed contact 91 of the manual selector.

When the operating refrigeration unit 28 lowers the cabinet air temperature sufficiently to close the thaw control contact 104, the relay coil 93 is again energized and the moving contacts 95 and 110 are shifted to deenergize the refrigeration unit 28 and energize the thaw heaters 70 and 71.

This cycling on and off of the heaters alternately with the refrigeration unit continues until the manual selector 90 is shifted to the "store" position. The normal frozen load would thaw in a few hours to 10 – 15 hours, depending on the quantity of the load, the specific mass, and shape of the load. If desired, the thaw cycle might thus be operated on a timed basis where a timer 115 might be employed in connection with the manual selector in a manner to shift the control from the "thaw" position to the "store" position after a given lapse of time.

It is noted that the use of the thaw cabinet keeps the temperature of the food below a given limit, typically on average less than the guideline limit of 45°F. The possible growth of bacteria on the thawing food thus is clearly minimized, and the noted confinement of the food during thawing eliminates the sanitation problem experienced with open shelf thawing commonly practiced before this invention.

The fans 75, 81, and 84 are auxiliary and operate only when the manual selector is in "thaw" position and ideally provide a moderately high air velocity within the cabinet for improved heat transfer characteristics of the thawing food. The plenum construction distributes the air flow over the heating elements 70 and 71 and pillows the heated air against the opposing top or bottom wall and outwardly in a generally horizontal direction along either the top or bottom wall of the cabinet and into the cabinet sections, while the return air from the cabinet is taken into the plenum by intermediately located inlet fans. This plenum arrangement directs the heated air to cabinet locations where food typically is not supported and thus does not create any local hot spots within the cabinet where the surface temperature of the product needlessly might be increased above the average cabinet air temperature.

While a roll in cabinet is illustrated and a cart 24 is used to hold the food in the cabinet, other shelf type cabinet interiors can be used with this plenum arrangement. With a cart, bottom clearance is maintained between the bottom shelf and the floor plenum outlet because of the height of the cart casters; while the nominal mandatory clearance above the upper most item on the cart leaves open the ceiling plenum outlet.

It thus is evident that uniform thawing air flow occurs within the cabinet to virtually eliminate hot spots. With shelving, the outward thawing air flow from the plenum and the intermediate return of air to the plenum even yet provides good uniform thawing air flow. This is in contrast to the possible locations of the plenum outlets adjacent the front or rear cabinet walls or at intermediate locations where the heated air might be blasted directly against food at this location.

ALTERNATE EMBODIMENT OF THE INVENTION

Figure 6:
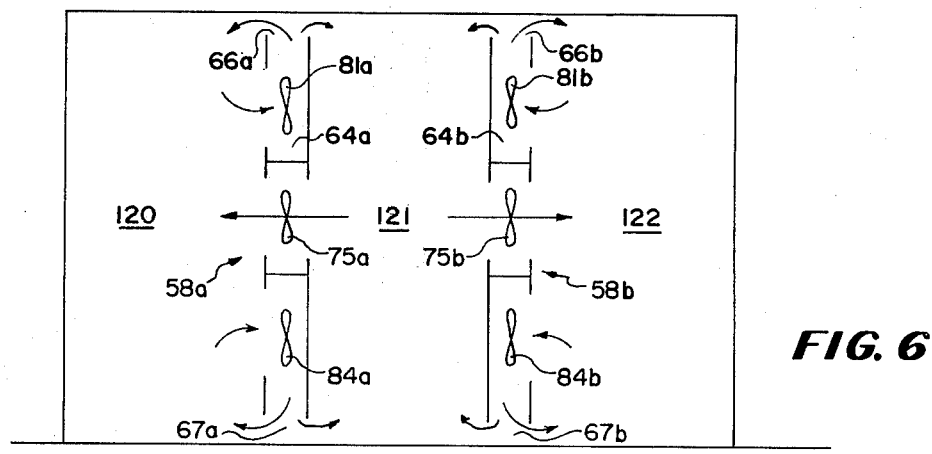
FIG. 6 is a sectional view, similar to FIG. 2, except showing a second embodiment of the invention utilizing three separated cabinet sections.

FIG. 6 illustrates generally in a schematic view similar to the two-section cabinet of FIG. 2, the partition arrangement preferred in a three-section cabinet. The manifold structure for distributing air to each of the designed sections 120, 121, and 122 would be similar to the disclosed cold and return air manifolds 45 and 46, and is not shown. The particular partition structure 58a would likewise be similar to that already described, except a second partition structure 58b would be used thereby dividing the enclosure into three sections 120, 121, and 122. The plenum arrangement would provide that the duct fans 75a and 75b circulate air from the center section 121, to the end sections 120 and 122, while the inlet fans 81a and 84a, and 81b and 84b draw air from the end sections into the respective defined plenum 64a and 64b for discharge out the upper outlets 66a and 66b and lower outlets 67a and 67b to both adjacent sections, including the respective end section 120 and 122 and the middle section 121.

What is claimed is:

1. In a combination refrigerator-thawer cabinet having opposed pairs of side walls and opposed bottom and top walls, refrigeration means for cooling air and means for ducting cabinet air over the refrigeration means and through the cabinet, a vertical partition interconnecting one pair of opposed side walls and dividing the cabinet into spaced sections, and said side walls including an access opening to each section and a door for selectively closing same, the improvement comprising said partition having spaced panels defining therebetween a plenum and each of said partition panels having upper and lower edges spaced from the top and bottom cabinet walls defining plenum outlets to both sections adjacent the top and bottom cabinet walls, upper and lower heating elements supported by the partition within the plenum, duct means through aligned openings in the partition panels defining an air passage between the sections that is isolated from the plenum and first fan means supported by the partition in the duct means, said partition also having plenum inlet openings in one panel only at locations outboardly spaced from the duct means and inboardly spaced from the heating elements and second fan means supported by the partition in these openings, means to operate the first fan means to move cabinet air through the duct means for high velocity discharge to the section exposed to the one panel and means to operate the second fan means to draw cabinet air in said section into the plenum for redirected flow over the heating elements and high velocity discharge from the plenum outlets to both sections, control means including a manual selector for operating the cabinet as a refrigerator or as a thawer, said control means also having first means operable with the cabinet as a refrigerator to cycle only the refrigeration means on and off respectively responsive to sensed preset high and low cabinet air temperatures, and said control means also having second means operable with the cabinet as a thawer to energize said first and second fan means and responsive to a sensed predetermined low cabinet air temperature of approximately 42°F to energize the heating elements and responsive to a sensed predetermined higher cabinet air temperature to deenergize the heating elements.

2. A combination refrigerator-thawer cabinet according to claim 1, wherein said control means also is effective to cycle the refrigeration means on when the heating means is deenergized and to cycle the refrigeration means off when the heating means is energized.

3. A combination refrigerator-thawer cabinet according to claim 1, wherein said first and second fan means are of the axial flow propeller type.

4. A combination refrigerator-thawer cabinet according to claim 1, wherein a second partition is further located in the cabinet interconnecting the one pair of opposed side walls and being spaced from and facing the one panel of the first mentioned partition, defining thereby with the side walls a third section, and wherein the second partition is structurally similar to the first mentioned partition further including having correspondingly a set of first and second fan means with the first fan means being effective for circulating air from the now common first mentioned section to the third section.

5. In a combination refrigerator-thawer cabinet having opposed pairs of side walls and opposed bottom and top walls, refrigeration means for cooling air and means for ducting cabinet air over the refrigeration means and through the cabinet, a vertical partition interconnecting one pair of opposed side walls and defining a cabinet section on one side thereof and a plenum on the other side thereof, and said side walls including an access opening to said section and a door for selectively closing same, the improvement comprising said partition having upper and lower edges spaced from the top and bottom cabinet walls defining plenum outlets to the section adjacent the top and bottom cabinet walls, upper and lower heating elements supported within the plenum, said partition also having a plenum inlet opening inboardly spaced from the heating elements and fan means supported in this opening, means to operate the fan means to draw cabinet air in said section into the plenum for redirected flow over the heating elements and high velocity discharge from the plenum outlets to the section, control means including a manual selector for operating the cabinet as a refrigerator or as a thawer, said control means also having first means operable with the cabinet as a refrigerator to cycle only the refrigeration means on and off respectively responsive to sensed preset high and low cabinet air temperatures, and said control means also having second means operable with the cabinet as a thawer to energize said fan means and responsive to a sensed predetermined low cabinet air temperature of approximately 42°F to energize the heating elements and responsive to a sensed predetermined higher cabinet air temperature to deenergize the heating elements.

\* \* \* \* \*